Aug. 22, 1933.  W. BLASCHK  1,923,907
DEVICE FOR PREVENTING THE THEFT OR UNAUTHORIZED USE OF AUTOMOBILES
Filed Oct. 30, 1931
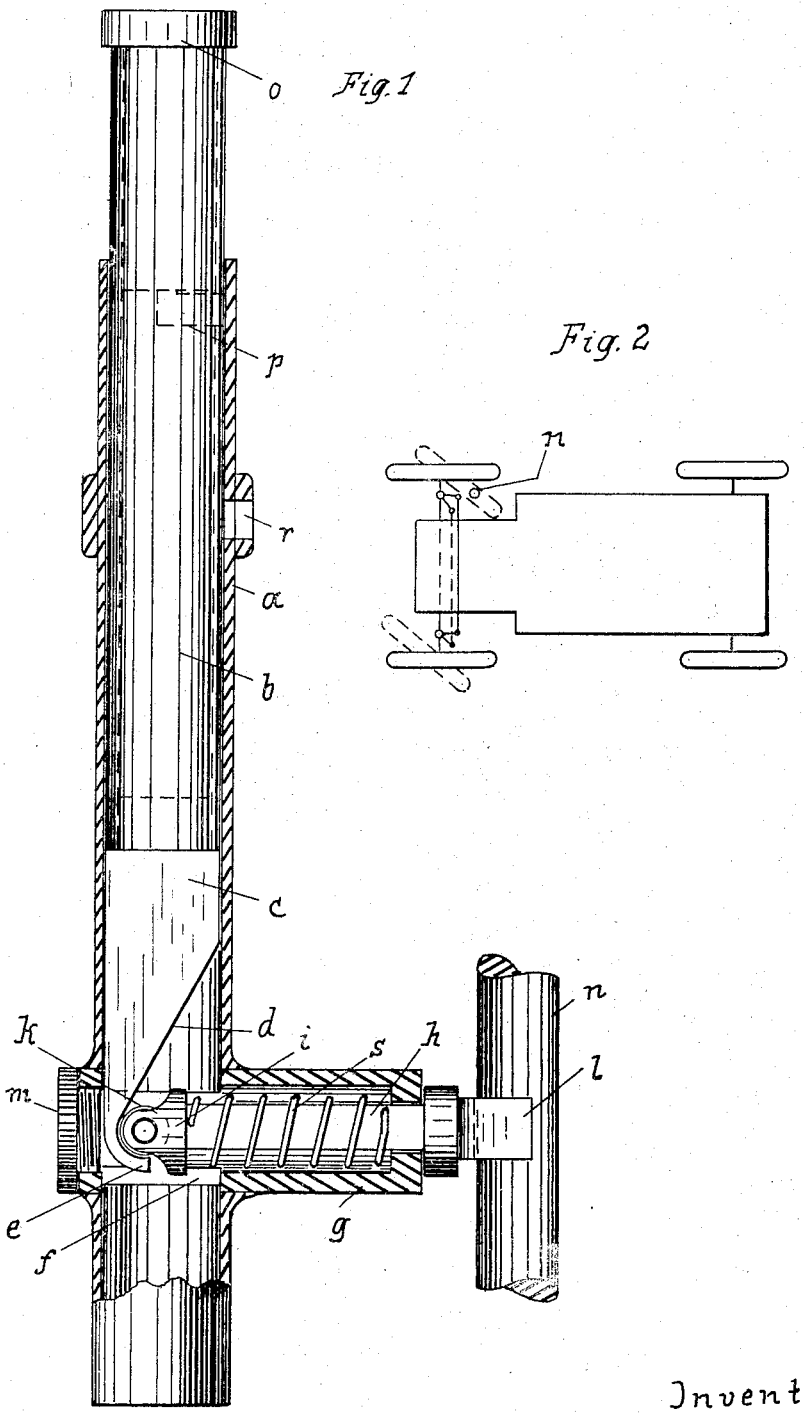
Inventor:
W. Blaschk
By H.T.Gee
Attorney.

Patented Aug. 22, 1933

1,923,907

UNITED STATES PATENT OFFICE 1,923,907

DEVICE FOR PREVENTING THE THEFT OR UNAUTHORIZED USE OF AUTOMOBILES

Willy Blaschk, Berlin, Germany

Application October 30, 1931. Serial No. 572,197

3 Claims. (Cl. 70—90)

The invention relates to a device for preventing the theft or unauthorized use of automobiles and more particularly to a device which to this end blocks the steering arms of the front wheels irrespective of whether said wheels are in a straight or oblique position. The same purpose may also be attained by the shaft contained in the steering column being braked by the novel device referred to.

The main object of the invention consists in providing means by which a thief or an unauthorized user is prevented from using the automobile by the fact that the steering gear is rendered ineffective.

The following is given as an example of how the invention may be practically made use of but the invention is not limited hereto and may be suitably modified within the scope of the invention as stated by the description and the claims appended.

In the drawing,

Fig. 1 is a sectional vertical view of the device and

Fig. 2 diagrammatically shows the positions of the front wheels when the latter are to be blocked by the device.

In Fig. 1 $a$ is a tubular body to be fastened to the dash or chassis of the car in any suitable manner so that the lower end containing the movable part is arranged about in the height of the parts of the steering gear or shaft to be blocked by the device. Within the tubular body $a$ is arranged a tube $b$ carrying at its lower end a driving wedge $c$ of flat or oval cross section and at its top a safety lock $o$ of any suitable system the bolt $p$ of which enters the notch $r$ when the tube $b$ and accordingly the wedge $c$ are to be kept in their lower, viz. locking position. The said wedge $c$ provided with the wedge face proper $d$ and bearing surface $e$ is guided, so as to be secured against turning, by a slot $f$ provided for in the tubular branch $g$ in which is slidably mounted a bolt $h$ upon which a pressure is exerted by a spring $s$. The head $i$ of the said bolt $h$ and which is acted upon by the wedge face $d$ may be provided with a roller $k$ so that the friction between head $i$ and face $d$ is diminished when the wedge $c$ is being lowered in order to displace the bolt $h$ in an outward direction. The bearing surface $e$ of the wedge $c$ is shaped like a hook and partially surrounds the head of the bolt $h$ so as to limit the upward movement of the tube $b$. The front end of the bolt $h$ may be provided with a fork head $l$ which is to bear against the steering lever of a front wheel or against the steering shaft in order to block this part of the steering gear. The front end of said bolt $h$ may also have the shape of a simple pin which penetrates into a recess of one of the parts referred to. When the bolt $h$ has been brought into its utmost position by the wedge $c$ having reached its lowest position, the wheels are blocked against steering independently of the angle of obliquity they show, provided that the lock bolt $p$ has been secured in its corresponding notch $r$. The tubular branch containing and guiding respectively the said bolt $h$ may be connected to the tubular body $a$ by welding or in any other suitable way. Its free end, through which bolt $h$ can be inserted or withdrawn, may be closed by a screw as $m$ or the like. The slots $f$ of the said tubular branch $g$ safely guide the wedge $c$ so that not only the same and the tube $b$ connected therewith are secured against turning but also the lock bolt $p$ so that it is prevented from missing its notch $p$.

Only by using the special key belonging to the safety lock $o$ it is possible to release the head $l$ or the corresponding locking pin from the part blocked of the steering gear, by lifting the tubular body $b$ and so to render the car again fit for running. As compared with safety devices already known the novel device above described affords the advantage that the blocking point proper is hidden in a spot very little conspicuous and not accessible, as a rule, to unauthorized users. Moreover also the point where the blocking device can be released is hidden within the car so that an unauthorized user is not aware of the fact that there is some blocking device and unable to quickly detect where and how the car has been brought into an inoperative condition.

What I claim as my invention, and desire to secure by Letters Patent, is—

1. A device for preventing the theft or unauthorized use of automobiles which comprises a bolt slidable in a tubular body, a wedge pressing the said bolt against the steering lever or shaft of an automobile when being displaced, a tube connected to said wedge and carrying the bolt of a safety lock, a tubular body in which the said tube is slidably mounted and a notch arranged in the said tubular body and intended for receiving the said bolt of a safety lock so as to secure the said tube and the wedge connected thereto in their locking position.

2. A device for preventing the theft or unauthorized use of automobiles which comprises a bolt slidable in a tubular body, a wedge pressing the said bolt against the steering lever or shaft of an automobile, the lower end of which wedge is hook-shaped and surrounds the inner end of the said bolt so as to limit the upward movement of the said wedge, a tube connected to said wedge and carrying the bolt of a safety lock, a tubular body to guide this tube and a notch arranged in this tubular body for receiving the said bolt of the safety lock so as to secure the said tube and the wedge connected thereto in their locking position.

3. A device for preventing theft or unauthorized use of automobiles according to claim 2, in which the wedge is guided in slots in the tubular body containing and guiding the locking bolt proper which presses against the steering lever or shaft, said slots in said tubular body preventing the wedge and the tube connected thereto from turning and hence preventing the bolt of the safety lock from missing its corresponding notch in the tubular body.

WILLY BLASCHK.